United States Patent
Drummond et al.

(10) Patent No.: US 6,296,600 B1
(45) Date of Patent: Oct. 2, 2001

(54) COMPOSITE CONTAINER HAVING FOAMED ADHESIVE

(75) Inventors: Michael T. Drummond, Laurinburg, NC (US); Alan D. Williams, Camden, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/570,665

(22) Filed: May 15, 2000

Related U.S. Application Data

(62) Division of application No. 09/197,275, filed on Nov. 20, 1998, now Pat. No. 6,135,346.

(51) Int. Cl.[7] .................................................. B31C 11/04
(52) U.S. Cl. ..................... 493/276; 493/269; 493/279; 493/328
(58) Field of Search .................. 493/276, 269, 493/272, 279, 296, 328, 331

(56) References Cited

U.S. PATENT DOCUMENTS

| | | |
|---|---|---|
| 3,338,270 | 8/1967 | Denenberg . |
| 3,555,976 * | 1/1971 | Carter et al. ................. 493/276 |
| 3,574,034 * | 4/1971 | Harvey et al. ................ 493/276 |
| 3,905,921 | 9/1975 | Cone et al. . |
| 3,960,624 * | 6/1976 | Erlandson .................... 493/276 |
| 4,256,526 * | 3/1981 | McDaniel .................... 493/129 |
| 4,259,402 | 3/1981 | Cobbs, Jr. et al. . |
| 5,016,812 | 5/1991 | Pedigrew . |
| 5,251,809 | 10/1993 | Drummond et al. . |
| 5,433,982 | 7/1995 | Yamada et al. . |
| 5,482,205 | 1/1996 | Drummond et al. . |
| 5,487,506 | 1/1996 | Drummond et al. . |
| 5,494,215 | 2/1996 | Drummond et al. . |
| 5,829,669 | 11/1998 | Drummond et al. . |
| 6,004,253 * | 12/1999 | Riedel et al. .................. 493/340 |

FOREIGN PATENT DOCUMENTS

| | | |
|---|---|---|
| 0 488 039 A1 | 6/1992 | (EP) . |
| 1 562 562 | 3/1980 | (GB) . |
| WO 95 24441 A1 | 9/1995 | (WO) . |

* cited by examiner

Primary Examiner—Peter Vo
Assistant Examiner—Sam Tawfik
(74) Attorney, Agent, or Firm—Alston & Bird LLP

(57) ABSTRACT

A multi-ply tubular container for products is provided having a first ply wrapped into a tubular shape and having an inner surface and a second ply wrapped into a tubular shape and having an outer surface positioned in face-to-face contact with the inner surface of the first ply. At least one of the first and second plies is a body ply formed of fibrous paperboard. A foamed adhesive is placed between the inner surface of the first ply and the outer surface of the second ply. The foamed adhesive reduces moisture contact with the paperboard body ply and results in increased container strength and lower manufacturing costs. The foamed adhesive is preferably a foamed aqueous adhesive. The foamed adhesive may be a substantially pure resin adhesive or a mixture of a resin and at least one filler. The two plies may comprise a paperboard body ply and a liner ply adhered together using a foamed adhesive placed therebetween. Additional layers, such as additional paperboard plies or label plies, may also be added to the tubular container and adhered using a foamed adhesive. An apparatus and method for constructing tubular containers is also provided.

14 Claims, 4 Drawing Sheets

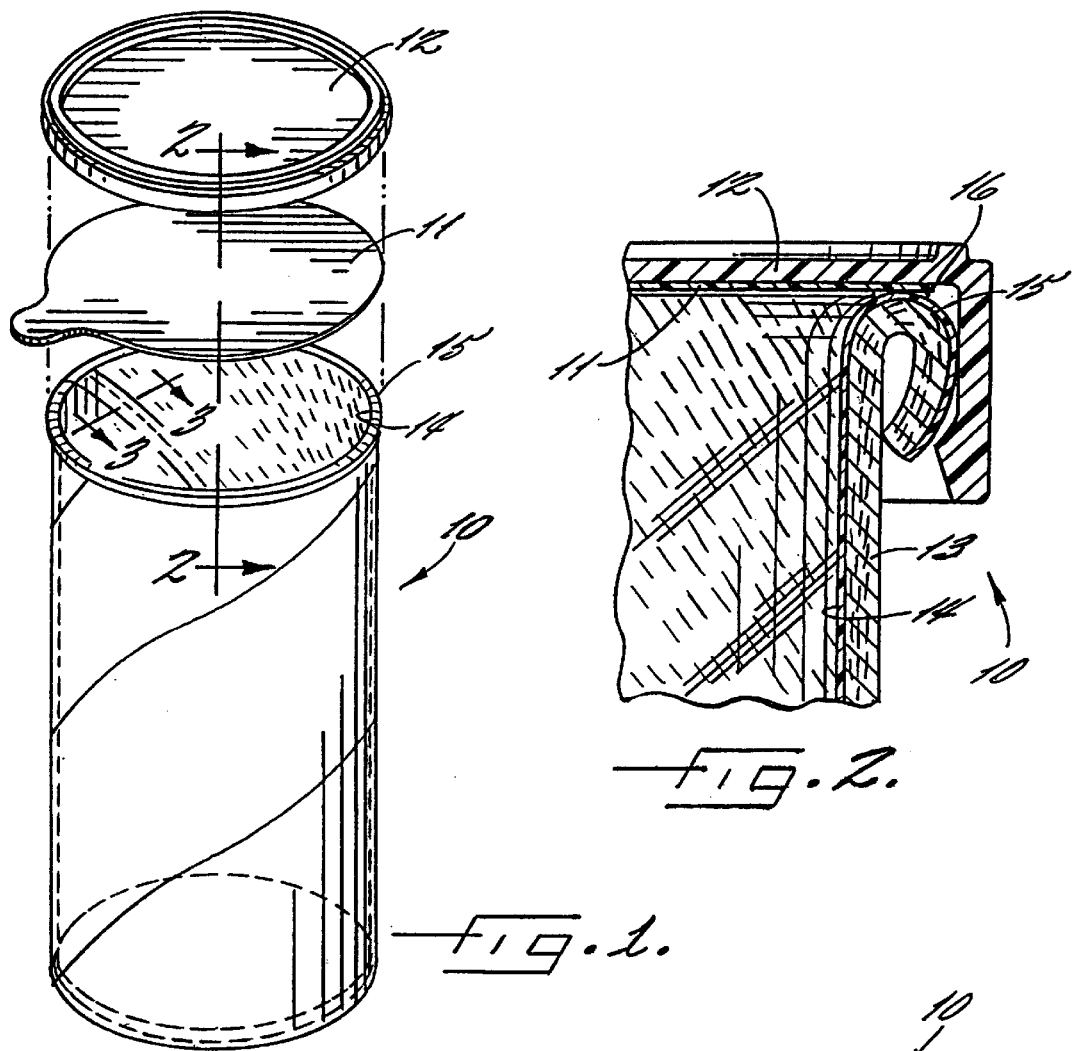
Fig. 1.
Fig. 2.
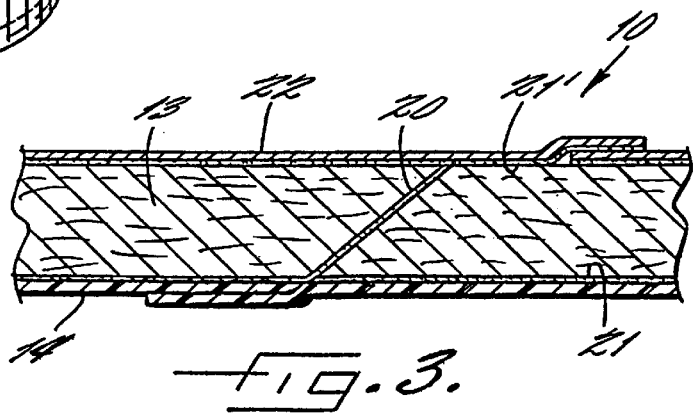
Fig. 3.

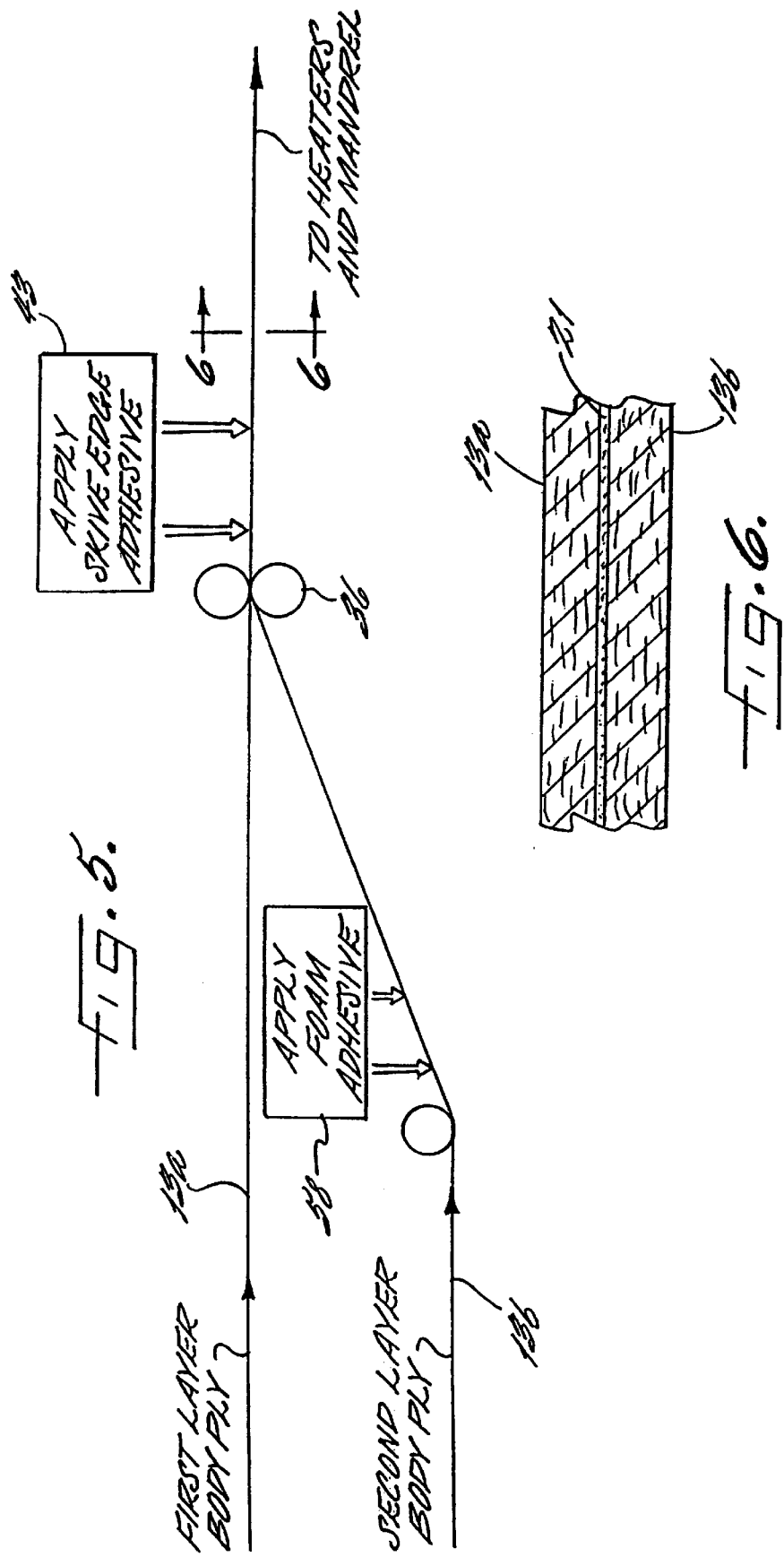

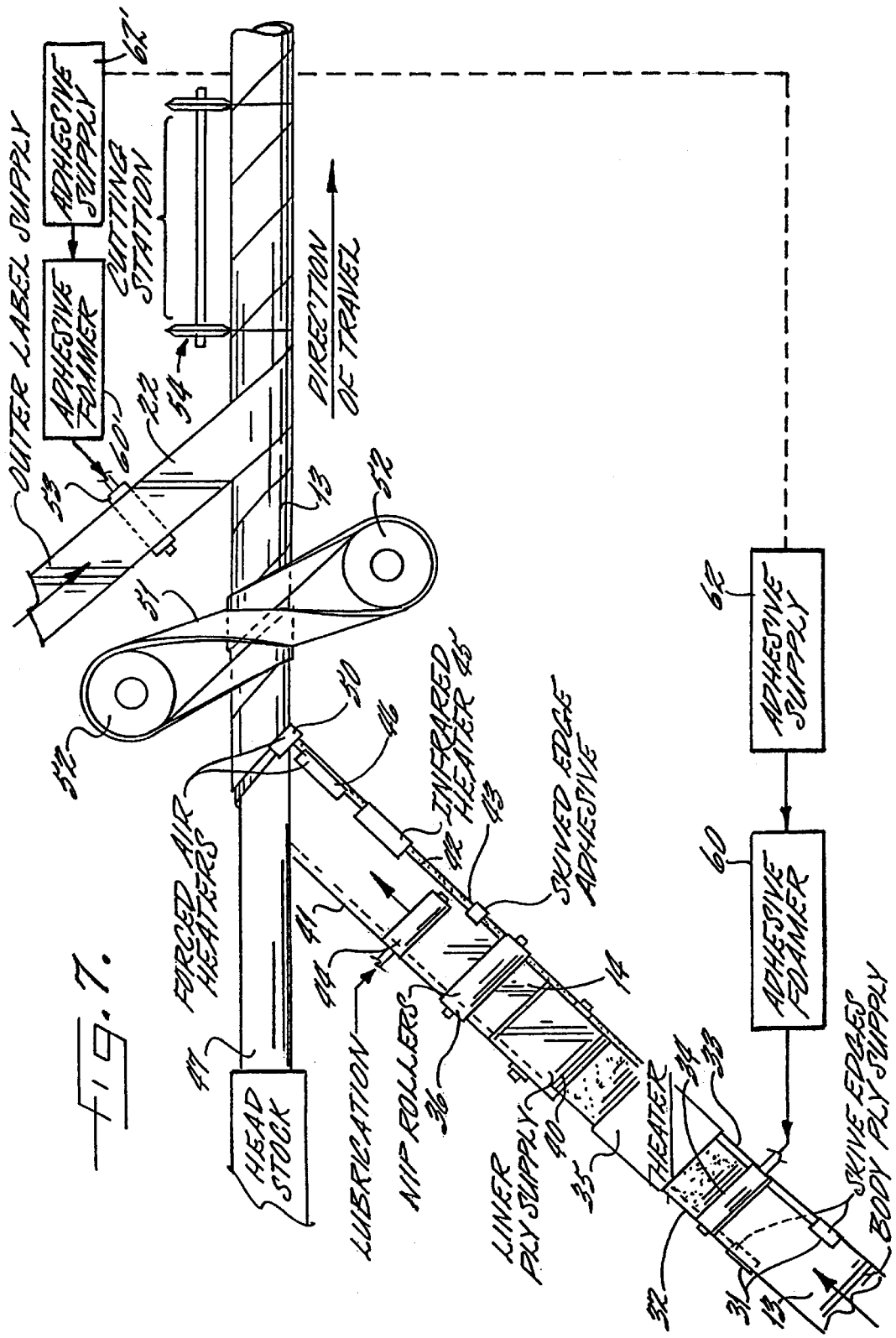

COMPOSITE CONTAINER HAVING FOAMED ADHESIVE

CROSS-REFERENCE TO RELATED APPLICATIONS

This application is a divisional of U.S. application Ser. No. 09/197,275, filed Nov. 20, 1998, now U.S. Pat. No. 6,135,346 which is incorporated by reference in its entirety.

FIELD OF THE INVENTION

The invention relates to composite containers, and more particularly relates to adhesives for composite containers.

BACKGROUND OF THE INVENTION

Food and drink products and other perishable items are often packaged in tubular containers which are sealed at both ends. These tubular containers typically include at least one structural body ply and are formed by wrapping a continuous strip of body ply material around a mandrel of a desired shape to create a tubular structure. The body ply strip may be spirally wound around the mandrel or passed through a series of forming elements so as to be wrapped in a convolute shape around the mandrel. At the downstream end of the mandrel, the tube is cut into discrete lengths and fitted with end caps to form the container.

Tubular containers of this type typically include a liner ply on the inner surface of the paperboard body ply. The liner ply prevents liquids from leaking out of the container and also prevents liquids from entering the container and possibly contaminating the food product contained therein. Preferably, the liner ply is also resistant to the passage of gasses, so as to prevent odors of the food product in the container from escaping and to prevent atmospheric air from entering the container and spoiling the food product. Thus, the liner ply provides barrier properties and the body ply provides structural properties.

Conventional techniques for constructing composite containers involve flooding one surface of the paperboard body ply with a liquid adhesive to facilitate bonding of the body ply to the interior liner ply to form the composite container. Since the liquid adhesives contain a large quantity of water, usually at least 50%, a large amount of moisture is added to the container. In most cases, the moisture reduces the compression strength of the container. This requires additional processing steps to dry the container prior to shipping. These processing steps add cost and delay. As a result, there is a need in the art for a method of eliminating the added cost and reduced container strength caused by the addition of moisture to the container. In addition, the adhesives are not inexpensive and it would be desirable to decrease the total amount of adhesives used to reduce the cost of materials for each container.

SUMMARY OF THE INVENTION

The present invention provides a tubular container having a foamed adhesive layer adhering a paperboard body ply to other plies of a multi-ply container wall. The other plies may be additional paperboard body plies, liner plies, label plies, or the like. The use of the foamed adhesive reduces the amount of moisture that comes into contact with the paperboard body ply. This, in turn, avoids the reduction in container strength that results from excessive moisture within the paperboard body ply. The use of a foamed adhesive also reduces manufacturing cost by allowing reduced adhesive usage and eliminating or greatly reducing the time required to dry the container prior to shipping. Further, the reduction in moisture introduced into the process reduces atmospheric humidity within the building which, in turn, reduces air conditioning costs required to eliminate the moisture. An apparatus and method for manufacturing the tubular containers of the present invention are also provided.

The present invention provides a multi-ply tubular container for products having a first ply wrapped into a tubular shape and having an inner surface. The tubular container further comprises a second ply wrapped into a tubular shape and having an outer surface positioned in face-to-face contact with the inner surface of the first ply. At least one of the above plies comprises a body ply formed of fibrous paperboard. A foamed adhesive is placed between the inner surface of the first ply and the outer surface of the second ply to adhere the two plies together. The adhesive is a foamed liquid prior to the first and second plies being positioned in contact.

Preferably the foamed adhesive comprises a foamed aqueous adhesive. Aqueous adhesives suitable for use with the present invention include vinyl acetate/ethylene copolymers, vinyl acetate, starch-based adhesives such as dextrin, polyvinyl acetate, polyvinyl alcohol, protein adhesives such as casein or soy-based adhesives, acrylic adhesives and mixtures thereof. The foamed adhesive may be in the form of a substantially pure resin or a mixture of a resin and one or more fillers. The filler may be selected from the group consisting of clay, calcium carbonate, talc, barium sulfate, nephylene syenite, feldspar, inert fillers such as ground pecan shells, and mixtures thereof.

In one particular embodiment, the multi-ply tubular container comprises at least one paperboard body ply and a liner ply. The paperboard body ply is wrapped into a tubular shape and has an inner and outer surface. The liner ply has an inner surface facing the interior of the container and an outer surface positioned in face-to-face contact with the inner surface with the paperboard body ply. Preferably, the liner ply includes a moisture and/or gas barrier layer. A foamed adhesive is placed between the inner surface of the paperboard body ply and the outer surface of the liner ply to adhere the plies together. Again, the adhesive is a foamed liquid prior to the body ply and liner ply coming into contact. Preferably the liner ply is substantially entirely formed of polymeric material; however, the liner ply may be constructed of various combinations of polymeric layers, paper layers, and aluminum foil layers.

The tubular container of the present invention can also include a label ply. The label ply preferably has an inner surface positioned in face-to-face contact with the outer surface of the paperboard body ply. A foamed adhesive is placed between the outer surface of the paperboard body ply and the inner surface of the label ply to adhere the plies together. The adhesive is a foamed liquid prior to the plies coming into contact.

The tubular container of the present invention may also include a second paperboard body ply having an inner surface positioned in face-to-face contact with the outer surface of the first paperboard body ply. Again, a foamed adhesive is placed between the outer surface of the first paperboard body ply and the inner surface of the second paperboard body ply to adhere the two plies together. The adhesive is a foamed liquid prior to the plies coming into contact.

An apparatus for manufacturing multi-ply tubular containers includes an adhesive foamer operatively connected to an adhesive applicator for supplying foamed adhesive to the adhesive applicator. The adhesive applicator is located adjacent to one surface of a body ply and applies a foamed adhesive to the surface of the body ply. The body ply is supplied in the form of continuous body ply material. A supply of continuous liner ply material is also provided. A shaping mandrel is positioned to adhere the body ply and the liner ply together with the foamed adhesive to form the two plies into a tubular shape. Advantageously, the apparatus further includes a cutting station adjacent to one end of the mandrel for cutting the tubular shape into discrete container lengths.

The apparatus of the present invention further includes a supply of continuous label ply material and a second adhesive applicator adjacent to one surface of the label ply for applying a foamed adhesive to the surface. The second adhesive applicator is operatively connected to the adhesive foamer for receiving foamed adhesive. The label ply is wrapped around the body ply downstream of the second adhesive applicator and adhered thereto with the foamed adhesive.

As described above, the tubular container of the present invention may also include additional body plies. In turn, the apparatus of the present invention may include a second supply of continuous body ply material and another adhesive applicator positioned adjacent to one surface of the second body ply for applying a foamed adhesive to the surface. The second adhesive applicator is operatively connected to the adhesive foamer for receiving foamed adhesive. Additionally, the second body ply is operatively positioned to contact and adhere to the first body ply downstream from the second adhesive applicator.

A method of manufacturing multi-ply tubular containers is also provided. The method comprises advancing a continuous first ply and continuous second ply towards a shaping mandrel wherein at least one of those plies comprises a body ply formed of fibrous paperboard. An adhesive composition is foamed to form a foamed adhesive which is then applied to at least one surface of the first and second plies. In that manner, the first and second plies are adhered together with the foamed adhesive. The first and second ply are wrapped around the shaping mandrel to create the tubular container. The first and second plies may be adhered together by passing the two plies in face-to-face contact prior to the wrapping step or they may be adhered during the wrapping step.

In one embodiment, the first ply comprises a continuous paperboard body ply and the second ply comprises a continuous liner ply having a moisture barrier layer. The foamed adhesive is applied to at least one surface of the paperboard body and liner plies and the two plies are adhered together and wrapped around the shaping mandrel to create a tubular container. Again, the adhering of the two plies may occur prior to the wrapping step or during the wrapping step.

As described above, the tubular container of the present invention may include additional layers such as paperboard body plies and label plies. If the tubular container contains these additional layers, then the foamed adhesive can be applied to at least one surface of the additional layer and first body ply and the additional layer and body ply are adhered together with the foamed adhesive.

The use of a foamed adhesive to adhere one or more of the plies together is highly beneficial because of the reduced overall moisture content. The amount of water which comes into contact with the paperboard plies is reduced (because of the air content of the foam) which in turn reduces the decrease in strength attributable to the water. The amount and expense of the drying procedures used to remove the water are also reduced, as is the total amount and cost of adhesive used.

BRIEF DESCRIPTION OF THE DRAWINGS

Figure 4:
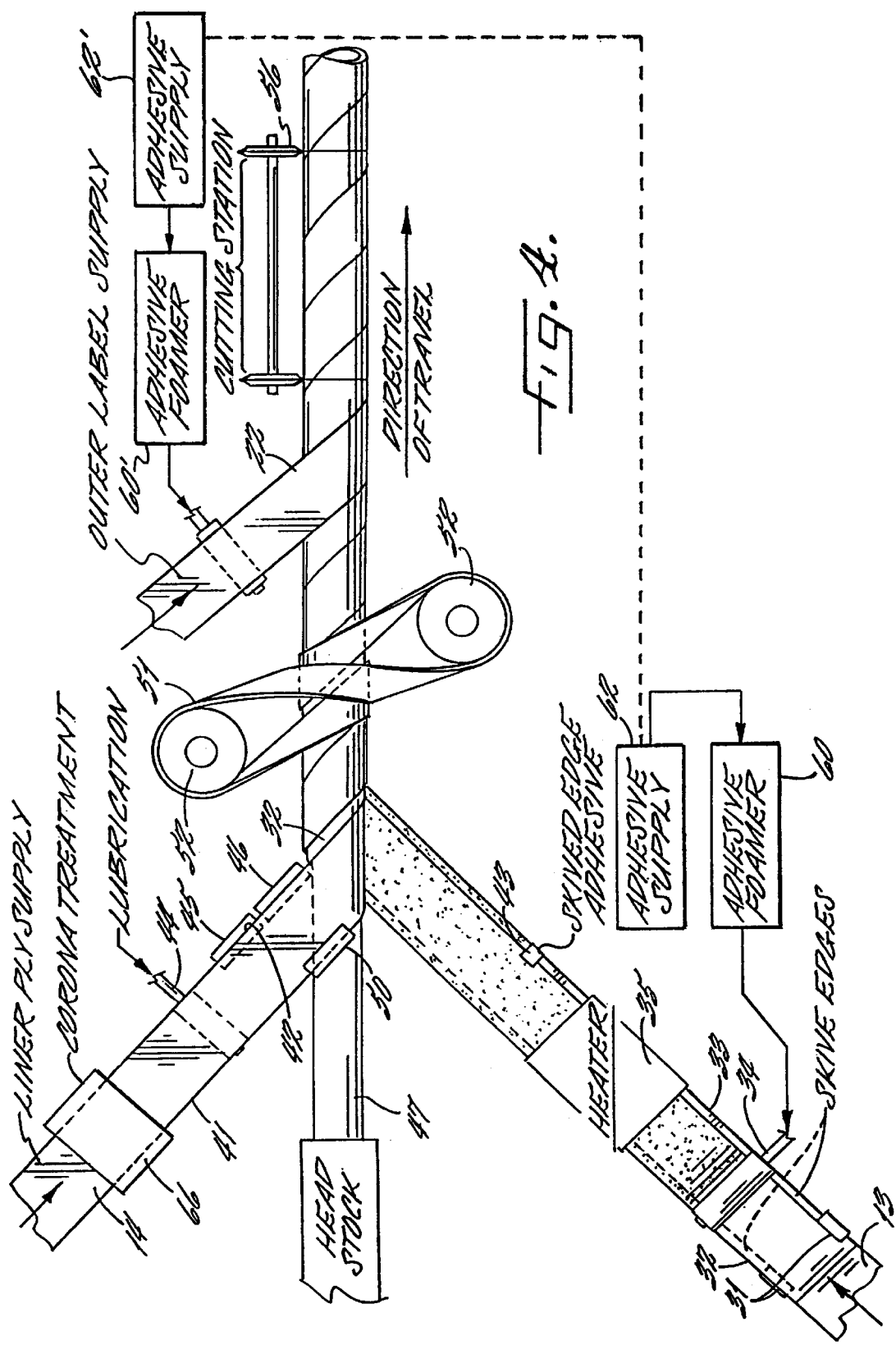

Having thus described the invention in general terms, reference will now be made to the accompanying drawings, which are not necessarily drawn to scale, and wherein:

FIG. 1 is an exploded perspective view of a tubular container according to the present invention;

FIG. 2 is a fragmentary and enlarged sectional view of an end of the tubular container taken along line 2—2 of FIG. 1;

FIG. 3 is an enlarged sectional view of a paperboard body ply and a liner ply taken along lines 3—3 of FIG. 1;

FIG. 4 is a plan view of one embodiment of the apparatus according to the present invention for making a tubular container;

FIG. 5 is a schematic elevational view of an apparatus for manufacturing a tubular container having two body plies according to another embodiment of the invention;

FIG. 6 is a fragmentary and enlarged sectional view of one edge of the body plies adhered together in the apparatus of FIG. 5;

FIG. 7 is a plan view of another embodiment of the apparatus according to the present invention for making a tubular container.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A tubular container 10 according to the present invention is illustrated in FIG. 1. Although illustrated as having a circular cross-section, the tube may have any cross-sectional shape which can be formed by wrapping the tube around an appropriately shaped mandrel. The embodiment illustrated in FIG. 1 includes a membrane-type lid 11 and a reusable plastic end cap 12 that snaps into place over the lid. Various other end closures may be used, however, depending on the type of product which is to be packaged.

As illustrated in more detail in FIG. 2, a tubular container 10 includes a wall having at least one body ply 13 which is preferably formed of a fibrous paperboard and a liner ply 14 adhered to the inner surface of the body ply 13. The presence of a liner ply 14 is not necessary to practice the present invention, but such a liner is typically used. The liner ply 14 may be formed of one or more layers. Preferably, one of the layers forms a barrier to moisture and/or gases, depending on the application. It will be understood that various barrier materials and liner plies could be employed depending upon the item being packaged. For example, conventional liners include a layer of foil backed with kraft paper. However, in a preferred embodiment, the liner ply 14 is substantially entirely formed of polymeric material. In particular, liner plies such as described in copending U.S. patent application Ser. No. 08/796,793 now U.S. Pat. No. 5,829,669 to Drummond, et al., or Ser. No. 08/796,912 to Cahill, et al., both of which are assigned to the assignee of the present invention and are hereby incorporated by reference, may be used.

The upper end of the tubular container 10 is rolled over so as to form a bead or flange 15. The lid 11 may be hermetically sealed to the top of the bead 15 using a separate adhesive sealant 16. Alternatively, the lid 11 may be sealed to the top of the flange using a heat seal structure as described in U.S. patent application Ser. No. 09/065,783 to Drummond, et al., which is assigned to be the assignee of the present invention and is herein incorporated by reference. The end cap 12 is then snapped over the bead 15 and may be reused after the lid 11 has been removed. A closure (not illustrated) can be secured to the opposite end of the container 10. The closure is preferably constructed of metal or a composite construction of polymeric and paper layers.

The seams where the various plies are joined together are illustrated in FIG. 3. The paperboard body ply 13 is made of a relatively thick and stiff paperboard. Accordingly, the edges are first skived and then joined together during the tube forming process with an adhesive 20 to create a strong seam.

The liner ply 14 is adhered to the inner surface of the body ply 13 with a foamed adhesive 21 and the overlapping edges of the liner ply are adhered together to ensure that the container 10 is completely sealed. The use of a foamed adhesive reduces the amount of liquid that comes in contact with the paperboard body ply. This, in turn, avoids the undesirable decrease in compression strength of the container that excessive moisture may cause. A reduction in cost is also realized due to lower adhesive usage and less time required to remove moisture from the container prior to shipping. However, a certain amount of moisture contact with the paperboard is desirable in order to place the paperboard in a sufficiently pliable state so that the can bead or flange 15 may be formed.

The foamed adhesive 21 may be any liquid adhesive known in the art that can be applied in the form of a foam. Preferably, the foamed adhesive is a foamed aqueous adhesive. Examples of suitable adhesives include vinyl acetate/ethylene copolymers, vinyl acetate, starch-based adhesives such as dextrin, polyvinyl acetate, polyvinyl alcohol, protein adhesives such as casein or soy-based adhesives, acrylic adhesives and mixtures thereof. However, it should be understood that the benefits of foaming the adhesive could also be used with other adhesives wherein the liquid vehicle is not water but some other solvent or the like.

The foamed adhesive 21 may be used in a substantially pure resin form or as a mixture of a resin and one or more fillers. The filler can be any filler known in the art, such as clay, calcium carbonate, talc, barium sulfate, nephylene syenite, feldspar, inert fillers such as ground pecan shells, and mixtures thereof.

Referring to FIG. 3, a label ply 22 is preferably adhered to the outer surface of the body ply 13 having various indicia printed thereon regarding the product within the container. Advantageously, the label ply 22 is adhered to the body ply 13 using a foamed adhesive 21'. The use of foamed adhesive 21' provides the same advantage of reducing moisture contact with the body ply 13 as seen with foamed adhesive 21 used to adhere the body ply 13 to the liner ply 14.

An apparatus for making tubular containers according to the present invention is illustrated in FIG. 4. A continuous strip of paperboard body ply material 13 is supplied to the apparatus and is first passed through a pair of opposed edge skivers 31. The edge skivers 31 remove part of the square edge of the body ply 13 to create first 32 and second 33 edges having a beveled configuration.

As shown in FIG. 4, the foamed adhesive 21 is applied in the form of a foam by adhesive foamer 60. The adhesive foamer 60 may be any suitable apparatus capable of placing the adhesive in the form of a foam. Advantageously, the adhesive foamer 60 is a dynamic foam generator for continuous foaming of liquids, such as the EcoMix apparatus manufactured by Hansa Industrie. This apparatus uses a rotating mixing head having a plurality of perforated tubes to aerate the liquid adhesive so that it has a uniform foam consistency. The gas used to aerate the liquid is preferably air, but may be any suitable inert gas. The size of the perforations and speed of the mixing head determine the amount of gas bubbles generated and the volume of the resulting foam. Other foam generators known in the art would also be suitable for use in the present invention.

The body ply 13 is then advanced through an adhesive applicator 34 which applies the foamed adhesive 21 to a surface of the body ply 13. The foamed adhesive 21 is supplied to the adhesive applicator 34 by passing a liquid adhesive from an adhesive supply 62 through the adhesive foamer 60. Optionally, the body ply 13 and foamed adhesive 21 applied thereto are then passed underneath a heater 35 which evaporates at least a portion of the water content of the foamed adhesive 21 to render the adhesive substantially tacky. However, the need for such a heater 35 can be greatly reduced or eliminated because the adhesive is used in the form of a foam having reduced moisture content.

After applying the foamed adhesive 21 to the body ply 13, the body ply 13 and the liner ply 14 are fed to the shaping mandrel from opposite directions. The body ply 13 is passed under a skive adhesive applicator 43 which applies the skive adhesive 20 to the beveled surface of the skived second edge 33 of the body ply 13. The skive adhesive 20 is preferably a hot melt adhesive of the type which is conventional in the art, although it could also be a water-based or other solvent-based adhesive including one or more polymers. Polyvinyl acetate and ethylene vinyl acetate are the preferred liquid adhesives. If a solvent-based adhesive is used, the skive adhesive also could be utilized in the form of a foam using an adhesive foamer as described herein. Skive adhesive 20 helps provide a stronger body ply bond, especially for single body ply containers.

Advantageously, the surface of the liner ply 14 that contacts the body ply 13 is sometimes subjected to a corona treatment station 66. The opposite surface of the liner ply 14 is coated with lubricant from a roller 44 which allows the liner ply to slide smoothly on the mandrel during the winding operation.

The liner ply 14 has a first marginal edge 41 and a second marginal edge 42. In the illustrated embodiment, the liner ply 14 is subjected to heat from three heaters 45, 46 and 50, which may comprise infrared or forced air heaters, to cause the first marginal edge portion 41 of the liner to be adhered to the second marginal edge portion 42. It is to be understood that the number and location of these heaters can be varied based on the type of liner used and its constituent materials, the type of overlap seam used, the speed of the winding operation and other factors. In any event, the method and means chosen for sealing the liner ply 14 to itself are not seen by the inventors as critical to the claimed invention.

The body ply 13 and the liner ply 14 are wrapped around a shaping mandrel 47 from opposite sides of the mandrel. Each ply is wrapped around the mandrel 47 in helical fashion with the liner ply 14 wound against the surface of the mandrel.

As the body ply 13 is further wrapped and the first edge 32 of the body ply advances back under the mandrel 47 after one complete revolution, the first edge is brought into contact with the second edge 33 of the ensuing portion of the body ply which is first coming into contact with the mandrel. The skived edges 32, 33 become abutted together and the skive adhesive 20 adheres the edges together to form a spirally wound tube which advances along the mandrel 47. As would be readily understood by one of ordinary skill in the art, the apparatus of the present invention could also wrap the tubular container longitudinally to form a convolute container.

The first marginal edge portion 41 of the liner ply 14 is brought into an overlapping relationship with the second marginal edge portion 42 to create a sealed straight lap seam as seen in FIG. 3. Alternatively, an anaconda fold could be used wherein the seam is formed by folding back an overlying edge of the liner ply 14 on itself and then sealing that edge to an underlying edge of the liner ply.

The tube is then advanced down the mandrel 47 by a conventional winding belt 51 which extends around a pair of opposed pulleys 52. The winding belt 51 not only rotates and advances the tube, but also applies pressure to the overlapping edges of the body ply 13 and liner ply 14 to ensure a secure bond between the respective ply edges.

The label ply 22 is then preferably passed over an adhesive applicator 54 and wrapped around the body ply 13. The label ply 22 could be applied before the winding belt 51. Advantageously, the adhesive applied by the adhesive applicator 53 is also in the form of a foam. The foamed adhesive is applied by an adhesive foamer 60' which receives liquid adhesive from an adhesive supply 62'. As illustrated, the adhesive supplies 62, 62' are separate and feed separate adhesive foamers 60, 60'. However, the adhesive roamer and adhesive supply could be the same adhesive foamer and adhesive supply for both the body ply 13 and label ply 22 as schematically illustrated by the dotted line in FIG. 4.

Finally, at a cutting station 56, the continuous tube is cut into discrete lengths and removed from the mandrel 47. The ends of the container 10 are then rolled outwardly to form the bead 15. A closure, such as a metal closure (not illustrated), can be secured to one end of the container 10. After being filled with the food product, the lid 11 is sealed onto an end of the container 10. The end cap may then be placed over the lid 11.

FIG. 7 illustrates another embodiment of an apparatus for forming the tubular containers of the present invention. As shown, after the heater 35, the body ply 13 is advanced into a pair of opposed nip rollers 36 where the body ply is adhered to a continuous strip of liner ply material 14 fed from a reel 40. The liner ply 14 and body ply 13 are nipped together by the rollers 36 in an offset alignment such that a first marginal edge portion 41 of the liner ply extends beyond the first edge 32 of the body ply.

After the nip rollers 36, the body ply 13/liner ply 14 laminate is passed under a skive adhesive applicator 43 which applies the skive adhesive 20. The surface of the liner ply 14 may then be coated with a lubricant from a roller 44.

The laminate is then passed under an infrared heater 45 which heats the second marginal edge portion 42 of the liner ply 14 and also may heat the second edge 33 of the body ply 13. After the infrared heater 45, the second marginal edge portion 42 of the liner ply 14 is passed under at least one forced air heater 46.

The laminate is then wrapped around a shaping mandrel 47 in a helical fashion as described above. The first marginal edge portion 41 of the liner ply 14 is exposed on the mandrel 47 and is subjected to heat from a second forced air heater 50 as the laminate is further wrapped. The first edge 32 of the body ply 13 advances back under the mandrel 47 after one complete revolution and is brought into contact with the second edge 33 of the ensuing portion of the body ply 13. The skived edges 32, 33 become abutted to form a spirally wound tube which advances along the mandrel 47. The first marginal edge portion 41 of the liner play 14 is brought into an overlapping relationship with the second marginal edge portion 42 to create a sealed straight lap seam.

In a further embodiment of the tubular container 10 according to the present invention, the wall of the tubular container comprises at least two body plies. FIG. 6 illustrates the body wall of a tubular container 10 having two body plies 13a, 13b with a foamed adhesive 21 therebetween. As described above, the use of a foamed adhesive reduces the amount of moisture in contact with the paperboard body plies (because of the bubbles and air content of the foam), resulting in lower cost of construction and increased container strength. This embodiment is advantageous if additional strength is necessary.

An apparatus for constructing a container 10 having multiple body plies is shown in FIG. 5. A first body ply 13a and a second body ply 13b are passed through a pair of nip rollers 36 after coating at least one surface of either body ply with a foamed adhesive using adhesive applicator 58. The two plies 13a, 13b are adhered together by the foamed adhesive. The resulting laminate may then be fed to the mandrel and used to form the tubular container 10 of the present invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of manufacturing multi-ply tubular containers, comprising the steps of:
   advancing a continuous first ply towards a shaping mandrel;
   advancing a continuous second ply towards the shaping mandrel, at least one of the first and second plies comprising a body ply formed of fibrous paperboard;
   foaming a solvent-based adhesive composition to form a foamed adhesive;
   applying the solvent-based foamed adhesive to a surface of at least one of the first and second plies;
   adhering the first and second plies together with the solvent-based foamed adhesive; and
   wrapping the first ply and second ply around the shaping mandrel to create a tubular container.

2. A method according to claim 1, wherein said adhering step comprises passing the second ply in face-to-face contact with the first ply to adhere the second ply to the first ply prior to said wrapping step.

3. A method according to claim 1, wherein said adhering step occurs during said wrapping step as the tubular container is formed on the shaping mandrel.

4. A method according to claim 1, wherein said foaming step comprises foaming an aqueous adhesive composition.

5. A method according to claim 4, wherein said foaming step comprises foaming an aqueous adhesive composition selected from the group consisting of vinyl acetate/ethylene copolymers, vinyl acetate, dextrin, polyvinyl acetate, polyvinyl alcohol, casein, soy-based adhesives, acrylic adhesives and mixtures thereof.

6. A method of manufacturing multi-ply tubular containers, comprising the steps of:

advancing a continuous paperboard body ply towards a shaping mandrel;

advancing a continuous liner ply towards the shaping mandrel, said liner ply comprising a moisture barrier layer;

foaming a solvent-based adhesive composition to form a foamed adhesive;

applying the solvent-based foamed adhesive to a surface of at least one of the paperboard body and liner plies;

adhering the body ply and liner ply together with the solvent-based foamed adhesive; and wrapping the body ply and liner ply around the shaping mandrel to create a tubular container.

7. A method according to claim 6, wherein said adhering step comprises passing the liner ply in face-to-face contact with the body ply to adhere the liner ply to the body ply prior to said wrapping step.

8. A method according to claim 6, wherein said adhering step occurs during said wrapping step as the tubular container is formed on the shaping mandrel.

9. A method according to claim 6, wherein said foaming step comprises foaming an aqueous adhesive composition.

10. A method according to claim 9, wherein said foaming step comprises foaming an aqueous adhesive composition selected from the group consisting of vinyl acetate/ethylene copolymers, vinyl acetate, dextrin, polyvinyl acetate, polyvinyl alcohol, casein, soy-based adhesives, acrylic adhesives and mixtures thereof.

11. A method according to claim 6, further comprising the steps of:

advancing a second continuous paperboard body ply towards the shaping mandrel;

applying the solvent-based foamed adhesive to a surface of at least one of the first and second paperboard body plies; and adhering the first and second body plies together with the solvent-based foamed adhesive.

12. A method according to claim 6, further comprising the steps of:

advancing a continuous label ply towards the shaping mandrel;

applying the solvent-based foamed adhesive to a surface of at least one of the label and body plies; and adhering the label ply and body ply together with the solvent-based foamed adhesive.

13. A method according to claim 12, wherein said adhering step comprises wrapping the label ply around the tubular container on the shaping mandrel to adhere the label ply to the body ply.

14. A method according to claim 6, further comprising the step of cutting the tubular container into discrete container lengths.

* * * * *